United States Patent [19]

Yamaki et al.

[11] 4,216,530

[45] Aug. 5, 1980

[54] NAVIGATION INSTRUMENT FOR ROADWAY VEHICLES

[75] Inventors: Kiyoshi Yamaki, Yokohama; Masanori Mizote, Yokosuka; Takashi Oka, Toyko; Hideoki Matsuoka, Yokohama; Hiroyuki Nomura, Yokohama; Takaaki Mogi, Yokohama; Akitoshi Mimura, Tokorozawa, all of Japan

[73] Assignee: Nissan Motor Company, Limited, Yokohama, Japan

[21] Appl. No.: 973,903

[22] Filed: Dec. 28, 1978

[30] Foreign Application Priority Data

Jan. 10, 1978 [JP] Japan .................................. 53-1366
Jan. 11, 1978 [JP] Japan .................................. 53-1679
Jan. 11, 1978 [JP] Japan .................................. 53-1681

[51] Int. Cl.² .......................... G01P 3/56; G01C 23/00
[52] U.S. Cl. ................................ 364/565; 364/424; 364/444; 364/446; 235/92 TC; 340/161
[58] Field of Search ............... 364/565, 440, 446, 460, 364/438, 424, 444; 235/92 DN, 92 TF, 92 PE, 92 FQ, 92 TC, 92 MT; 324/160, 161, 166, 178; 73/488, 490; 35/10.2

[56] References Cited

U.S. PATENT DOCUMENTS

| | | | |
|---|---|---|---|
| 3,413,597 | 11/1968 | Crow | 364/444 |
| 3,637,996 | 1/1972 | Seymour | 235/92 DN |
| 3,649,818 | 3/1972 | Sylvander et al. | 364/446 |
| 3,748,580 | 7/1973 | Stevens et al. | 324/178 |
| 3,780,272 | 12/1973 | Rohner | 364/424 |
| 3,816,716 | 6/1974 | DeGarmo | 364/446 |
| 3,836,690 | 9/1974 | Purtle, Jr. | 35/10.2 |
| 3,838,341 | 9/1974 | Gaines | 324/161 |

Primary Examiner—Charles E. Atkinson
Assistant Examiner—Gary Chin

[57] ABSTRACT

A navigation instrument for roadway vehicles comprises a first counter for counting pulses each occurring in response to the vehicle moving a predetermined distance to detect the distance travelled from the starting point of a trip, a second counter for counting clock pulses to detect the time elapsed from the start of the vehicle. A microcomputer or digital circuitry is provided to compute on the data received from the first and second counters to derive an output data representative of the average speed of the vehicle over the distance so far travelled and to compare the computed average speed with a desired speed to detect the deviation of the actual average speed from the reference. A comparator is provided to detect when this deviation exceeds a predetermined value to generate a warning signal to alert the vehicle driver to correct the vehicle speed.

7 Claims, 7 Drawing Figures

NAVIGATION INSTRUMENT FOR ROADWAY VEHICLES

BACKGROUND OF THE INVENTION

The present invention relates to a navigation instrument for roadway vehicles.

On scheduled roadway trips the vehicle is run at a desired speed to arrive at the destination on time. It is convenient for the vehicle driver to be constantly informed of the actual average speed of the vehicle over the distance travelled from the starting point of the trip. A known navigation meter or instrument for roadway applications are designed to compute the average speed of the vehicle constantly and indicate the computed speed. However, because of the varying traffic condition which the vehicle encounters during its trip, the average speed value also varies from instant to instant so that the vehicle driver has to constantly shift his attention to the meter. This is troublesome for the driver and sometimes undesirable for safety drive.

SUMMARY OF THE INVENTION

An object of the invention is to provide a navigation instrument which delivers a warning signal whenever the average speed of the vehicle exceeds a predetermined value to alert the driver to correct the vehicle speed.

Another object of the invention is to provide a navigation instrument which provides data as to the deviation of the distance travelled from a scheduled distance and as to the deviation of the time actually elapsed from the starting point from a scheduled time.

A further object of the invention is to provide a navigation instrument which displays various data on a time sequential basis to minimize the space required for indication and to permit the driver's attention to be concentrated on the same location of indication.

Preferably, the navigation instrument of the invention comprises a microcomputer, a keyboard and a display unit. The microcomputer receives data representing the distance travelled and the time elapsed from the starting point, and compute the average speed of the vehicle over the distance so far travelled. The keyboard delivers a reference data representing a desired vehicle speed to the microcomputer to permit to provide an output data indicative of the deviation of the actual average speed from the desired speed. A comparator is provided to detect when the deviation exceeds a predetermined value to generate a warning signal. The display unit indicates the computed average speed data as well as other data on a time serial basis.

BRIEF DESCRIPTION OF THE DRAWINGS

The invention will be further described by way of example with reference to the accompanying drawings, in which.

DETAILED DESCRIPTION

Figure 1:
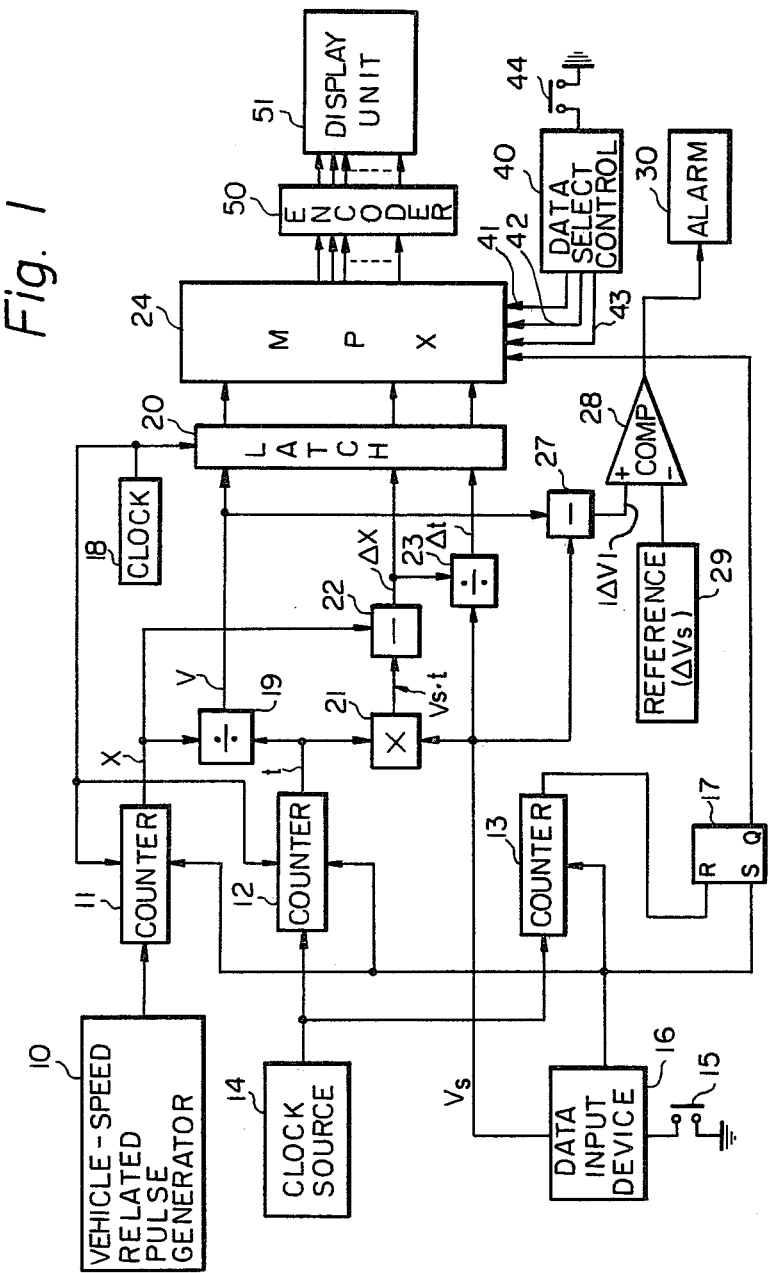
FIG. 1 is a schematic diagram of an embodiment of the invention.

Referring now to FIG. 1, a navigation instrument of the invention for roadway vehicles is schematically illustrated and comprises a pulse generator 10 for generating pulses at a frequency proportional to the speed of the vehicle. More specifically, the pulse generator 10 produces a pulse every time a known distance is travelled, this pulse being applied to a first or, distance binary counter 11 for detecting the distance travelled. Second and third counters 12 and 13 are provided to count the number of clock pulses received from a clock source 14. The clock pulses from the source 14 are accumulated in the second or time counter 12 to detect the total length of time elapsed from the start of the vehicle. The third counter 13 is designed to provide a carry out pulse in response to a count of a predetermined number of clock pulses which correspond to a period of 30 seconds, for example. All of these counters are reset to zero in response to a start pulse provided by a start key 15 mounted on a data input device 16. This start key is manually operated simultaneously when the vehicle is started on a predetermined course toward destination. The start pulse is also applied to the set input of a flip-flop 17 to cause its Q output to go high. The output from the third counter 13 is used to reset the flip-flop 17 to the original binary state.

The binary counter 11 delivers a binary output signal X which is a measure of the distance travelled from the starting point in response to a clock pulse received from a clock source 18. Similarly, the counter 12 delivers a binary output signal t representing the length of time elapsed from the start of the vehicle in response to each clock pulse from the source 18. These binary signals are applied to a divider 19 for dividing the binary output X by the signal t to detect the average value of the vehicle speed and delivers a corresponding binary output signal V to a latch circuit 20.

Prior to the start of the vehicle, an average vehicle speed is manually determined by dividing the distance to the destination by a desired journey time to that destination, and this average speed data is keyed into the data input device 16 and thence to a multiplier 21 for multiplying the binary signal t from counter 12 and a binary signal Vs representing the average vehicle speed supplied from the data input device 16. The output data Vs·t from the multiplier 21 is fed to a subtractor 22 for subtracting the actual distance X from the computed distance Vs·t to generate an output binary data ΔX. Since the computed distance is representative of a distance which might have been travelled if the vehicle is run exactly at the desired speed Vs, the output from the subtractor 22 is a measure of the deviation of the actual distance from the reference value Vs·t, and applied on the one hand to the latch circuit 20 and on the other hand to a divider 23 which functions as a divider for dividing ΔX by Vs to provide a third binary output Δt which represents the deviation of the actually elapsed time t from the reference value represented by X/Vs. The data Δt ia also fed to the latch circuit 20.

Figure 2:
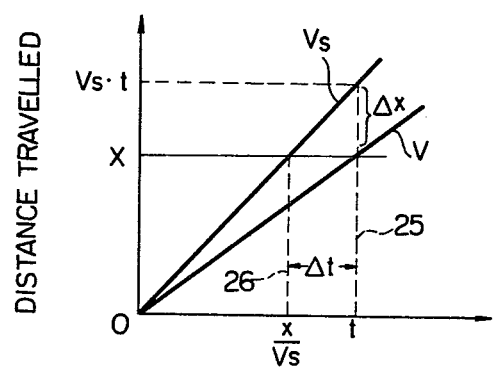
FIG. 2 is a graphic illustration of data to be indicated on the display unit.

As clearly shown in FIG. 2, a curve indicated at V corresponds to a plot of distances actually travelled from the starting point O on the vertical and horizontal coordinates as a function of time t and a curve indicated at Vs corresponds to a plot of distances which might have been travelled if the desired speed Vs is maintained. The deviation of distance ΔX corresponds to the difference between points on curves V and Vs intersecting a broken line 25 extending from a point t on the horizontal axis. The deviation of time Δt corresponds to the difference between points on curves V and Vs that intersect broken lines 25 and 26, the latter extending from a point X/Vs on the horizontal axis.

The data now stored in the latch circuit 20 are transferred to a multiplexer 24 in response to each clock pulses from the clock source 18.

The navigation instrument of the invention further includes a subtractor 27 for detecting the absolute value of the difference between the actual average speed V and the reference speed Vs and delivers a corresponding electrical signal |ΔV| to the noninverting input of a comparator 28 for comparison with a reference value ΔVs supplied from a reference source 29 which represents a limit of the deviation of the average speed V. If the deviation signal |ΔV| is smaller than the reference ΔVs, the output of the comparator 28 remains low and switches to a high voltage level when the limit value is reached to activate an alarm 30.

Figure 3:
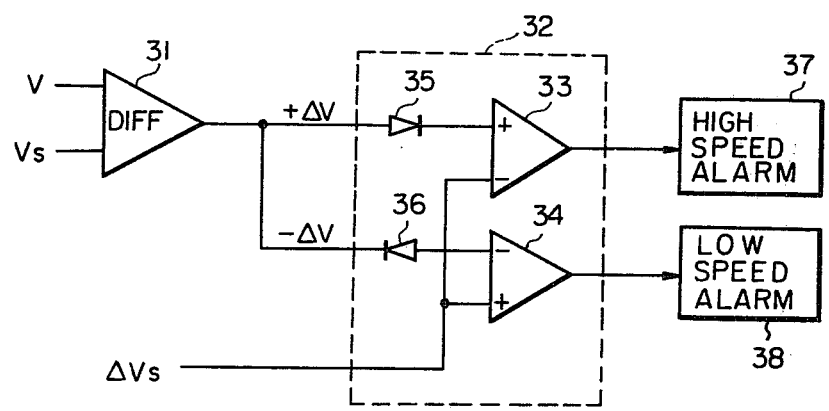
FIG. 3 is a modification of the embodiment of FIG. 1.

Preferably, the navigation instrument of FIG. 1 is modified as illustrated in FIG. 3 in which the subtractor 27 of FIG. 1 is replaced with a differential amplifier 31 which generates a positive polarity deviation output +ΔV when V is greater than Vs and a negative polarity deviation output −ΔV when V is smaller than Vs. The output signals from the differential amplifier 31 are applied to a discriminating circuit 32 comprising a high speed comparator 33 and a low speed comparator 34. The high speed comparator 33 receives the positive polarity output from differential amplifier through a diode 35 having its anode connected to the output of differential amplifier and its cathode connected to the noninverting input of the comparator 33. The low speed comparator 34 receives the negative polarity output of the differential amplifier through a diode 36 whose cathode is connected to the output of the differential amplifier 31 and whose anode is connected to the inverting input of the comparator 34. The inverting input of comparator 33 and noninverting input of comparator 34 are connected together to receive the reference voltage representing ΔVs.

When the direction of deviation of the actual average speed is positive and the magnitude of this deviation exceeds the set value ΔVs, the high speed comparator 33 generates an output signal having a high voltage level which activates an alarm 37 to indicate that the vehicle is running at an average speed much higher than the reference value Vs. Conversely, when the direction of this deviation is negative and its magnitude exceeds the set value ΔVs, the low speed comparator 34 generates a high voltage output which activates a low speed alarm 38 to indicate that the vehicle is running at an average speed much lower than the desired speed Vs. The vehicle driver is thus given information as to the direction in which the speed should be changed.

Although the arithmetic functions are represented by blocks in FIG. 1, these circuits can either be analog or digital. It is obvious to those skilled in the art to design the circuits of FIG. 1 with a microcomputer by programming its read-only memory using the conventional technique based on the above description.

The data now stored in the latch circuit 20 may be in the form of binary coded decimal (BCD) numbers if the arithmetic blocks are digital circuits, which are transferred to a BCD to decimal number encoder 50 through the multiplexer 24 which is designed to establish multiple paths between the latch 24 and the encoder 50 in response to data select signals applied thereto. The decimal number output signals from the encoder 50 are coupled to a display unit 51 which will be described hereinbelow.

Figure 4:
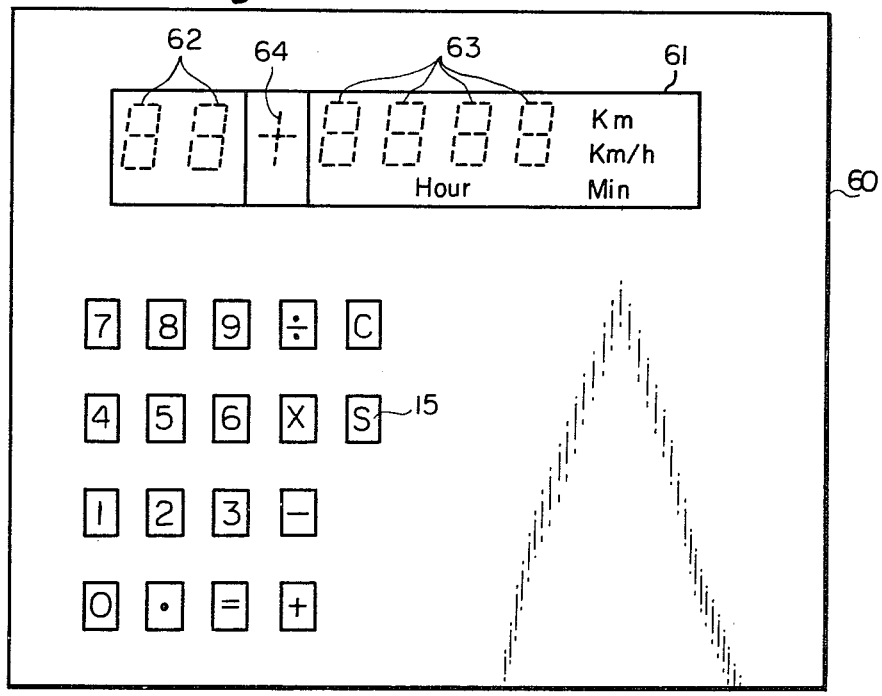
FIG. 4 is a plan view of the display unit shown incorporated in a keyboard.

As illustrated in FIG. 4 the display unit 51 is shown incorporated with the data input device 16 on a keyboard unit 60. On the upper part of the unit 60 a display panel 61 including a plurality of successively arranged segmented numeral indicators is provided. Numeral indicators 62 on the left side of the panel are used to indicate the computed average speed Vs, and the indicators 63 on the right side are used to indicate the data stored in the latch circuit 20 on a time-serial basis in response to data select signals supplied to the multiplexer 24 on leads 41, 42 and 43 from the data select control circuit 40. A character "Km" is to designate the unit of the deviation distance ΔX; "Km/h", to designate the unit of the actual average speed V, and "Hour" and "Min" for the deviation time ΔT. A sign indicator 64 is provided to indicate the direction of the deviation. On the lower part of the unit 60 is provided an array of various push buttons including numeral buttons for keying numerical data into the microcomputer for computing the desired speed and keying the computed desired speed. The keys designated with signs representing arithmetic operators are used to obtain the data to be keyed into the computer as a reference data as mentioned previously. The button designated "S" corresponds to the start key 15 and a button "C" is used to clear the input data.

Figure 5:
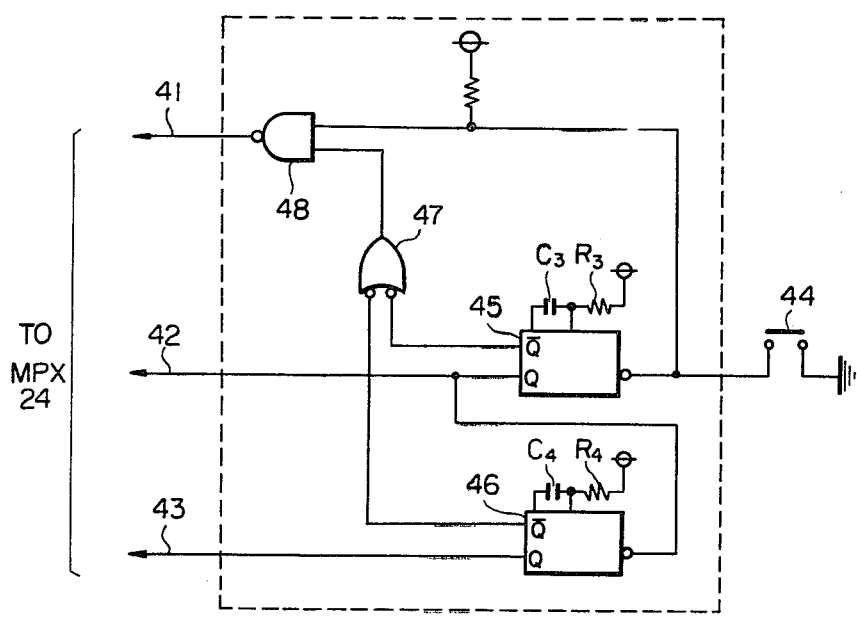
FIG. 5 is a diagram of a data select control circuit of FIG. 1.
Figure 6:
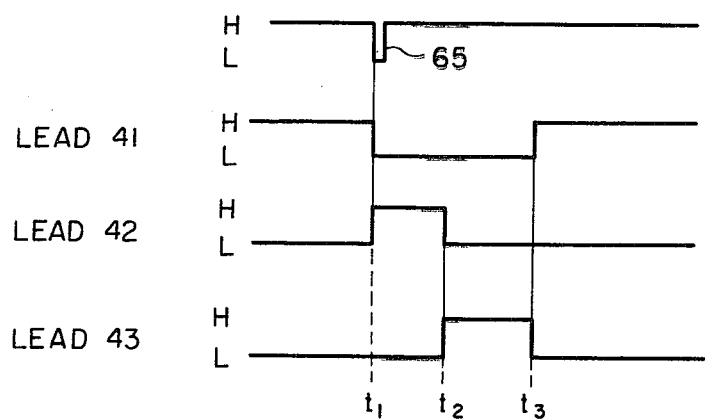
FIG. 6 is a timing diagram useful for describing the operation of the circuit of FIG. 5.

Details of the data select control circuit 40 are shown in FIG. 5. In response to momentary operation of switch 44 a low voltage pulse 65 is generated (FIG. 6). A NAND gate 48 is switched from a high to a low voltage output state at time $t_1$ and simultaneously a monostable multivibrator 45 is caused to switch its Q output to a high voltage condition. The high voltage condition of the monostable 45 is determined by the time constant circuit R3C3 which terminates at time $t_2$, whereupon a second monostable 46 is triggered into a high Q output state which continues during the time constant R4C4 until at time $t_3$. This causes the complementary output of monostable 46 to switch to a high voltage level. Signals from the complementary outputs of the monostable multivibrators 45 and 46 are coupled through an OR gate 47 to the NAND gate 48, so that at time $t_3$ the NAND gate is switched to a high voltage state. A set of pulses of different periods thus appears on leads 41, 42 and 43. Prior to time $t_1$, the multiplexer 24 establishes paths that connect the average speed data V to the encoder 50 and thence to the display unit 51 for indication of the average speed. During the period between times $t_1$ and $t_2$, the multiplexer is controlled to establish paths which connect the distance deviation data ΔX and during the interval between times $t_2$ and $t_3$, the multiplexer is switched to display the time deviation data Δt. During the time after time $t_3$, the average speed data is again displayed until the switch 44 is again operated by the vehicle driver.

The average speed data V which is key information to the vehicle driver is thus displayed for longer periods than the other information which is of minor importance.

Since the vehicle is run at a low speed for a certain period after it is started from the starting point, the interval between successive pulses from the pulse generator 10 is considerable so that if the start pulse is generated during such period the displayed data will not represent accurate information. Therefore it is preferable to disable the display unit for a certain interval after the start of the vehicle.

Referring again to FIG. 1, the flip-flop 17 is switched to a high voltage condition in response to the start pulse and remains there until this flip-flop is reset in response to the output of the counter 13 as mentioned previously. The output of the flip-flop 17 is a pulse of 30-second period and applied to the multiplexer 24 as a disable signal, whereby no data is displayed during such period. Alternatively, this disable signal is used to allow the multiplexer 24 to supply "0" digits to the display unit 51. Such "0" digit data may be flashed at a fast rate to indicate that display is inhibited.

Figure 7:
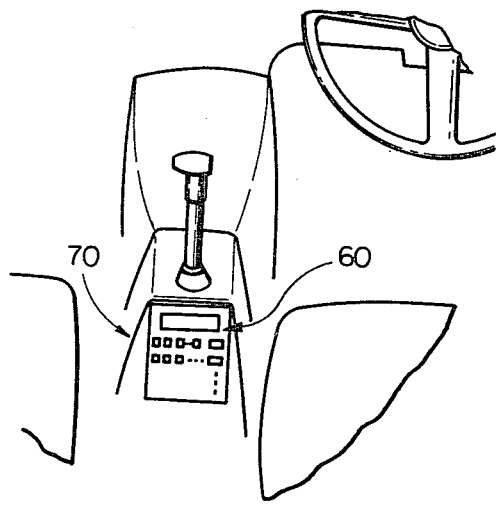
FIG. 7 shows the keyboard of FIG. 5 mounted on a console box of a vehicle.

The keyboard unit 60 is mounted on any location. For example, the unit 60 is mounted on the console box 70 as shown in FIG. 7. The display panel 61 may be mounted on the instrument panel of the vehicle separate from the keyboard unit.

What is claimed is:

1. A navigation instrument for roadway vehicles comprising:
   means for generating an actual distance signal representing a distance travelled from a starting point of a journey;
   means for generating an elapsed time signal representing the length of time elapsed from said starting point;
   at least two of first, second and third means, said first means including means for arithmetically dividing said actual distance signal by said elapsed time signal to generate an average speed signal representing the average speed of said vehicle over said distance travelled from said starting point; said second means including means for generating a constant speed reference signal representing an estimated average vehicle speed, means for arithmetcially multiplying said constant speed reference signal with said elapsed time signal to generate a distance reference signal representing an estimated distance from said starting point, and means for arithmetically subtracting said actual distance signal from said distance reference signal to generate a distance deviation signal representing the deviation of said distance travelled from said starting point from said estimated distance; and said third means including means for generating a time deviation signal representing the deviation of said length of time elapsed from said starting point from an estimated length of time from said starting point; and
   means for visually indicating at least two of said average speed signal, said distance deviation signal and said time deviation signal.

2. A navigation instrument as claimed in claim 1, wherein said third means comprises means for arithmetically dividing said distance deviation signal with said speed reference signal to generate said time deviation signal.

3. A navigation instrument as claimed in claim 1, further comprising a differential amplifier having a first input in receipt of said average speed signal and a second input in receipt of said speed reference signal to generate a speed deviation signal representing the deviation of said average speed over said travelled distance from said estimated vehicle speed, and means for generating a warning signal when said speed deviation signal exceeds a preset value.

4. A navigation instrument as claimed in claim 3, wherein said warning signal generating means comprises a first comparator for generating a high speed warning signal when said speed deviation signal of a first polarity exceeds said preset value and a second comparator for generating a low speed warning signal when said speed deviation signal of a second polarity exceeds said preset value.

5. A navigation instrument as claimed in claim 1, further comprising means for causing said at least two signals to be visually indicated successively.

6. A navigation instrument as claimed in claim 1, further comprising means for representing said at least two signals in decimal numbers, and wherein said visually indicating means comprises a digital display device responsive to said decimally represented signals.

7. A navigation instrument as claimed in claim 1, wherein means for generating an actual distance signal comprises means for generating a pulse in response to a known distance being travelled by said vehicle and a binary counter receptive of said pulse for generating a binary count of said received pulses to represent said distance travelled from said starting point, and wherein said means for generating an elapsed time signal comprises a time-base source for generating clock pulses and a binary counter for counting said clock pulses in response to said vehicle being started from said starting point to generate a binary count of said clock pulses for represention of said length of time elapsed from said starting point.

* * * * *